May 5, 1936.  E. F. ZAPARKA  2,039,676
AIRCRAFT
Filed Sept. 12, 1930   7 Sheets—Sheet 1
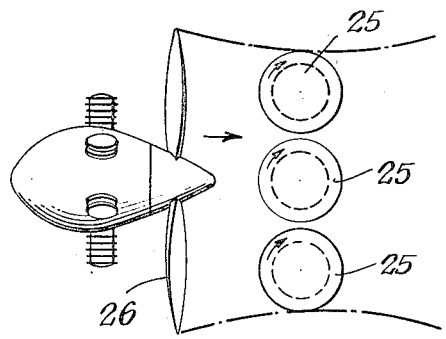
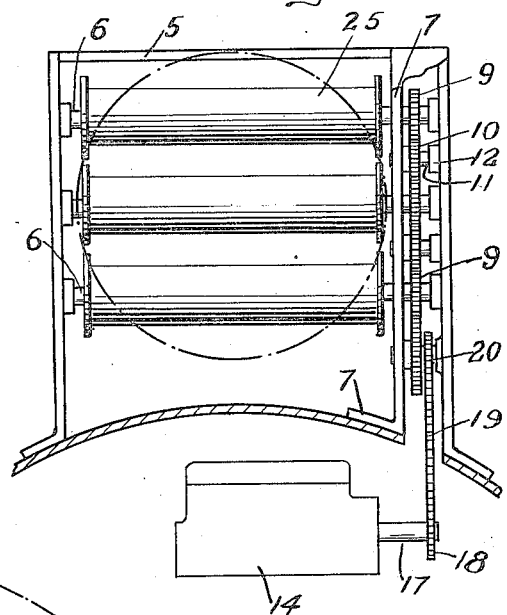
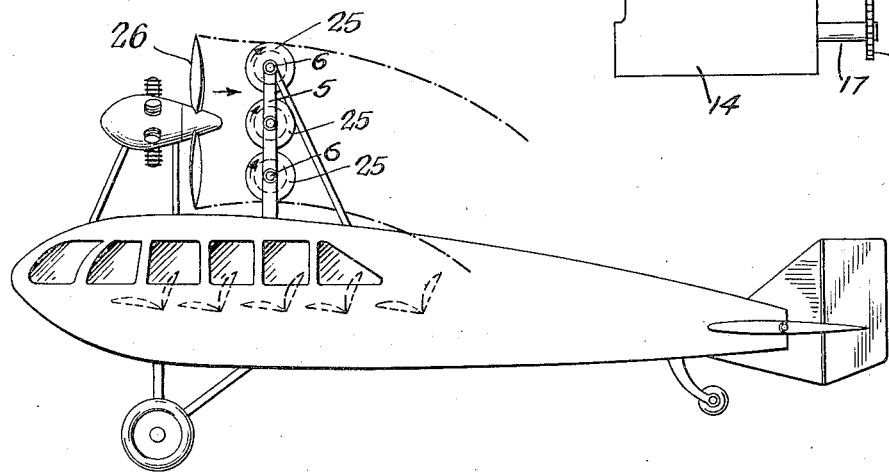
INVENTOR
Edward F. Zaparka
BY
Baselton, Whitcomb & Davies
ATTORNEYS May 5, 1936.  E. F. ZAPARKA  2,039,676
AIRCRAFT
Filed Sept. 12, 1930   7 Sheets-Sheet 3
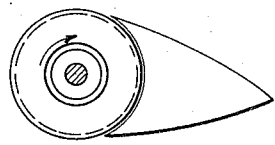
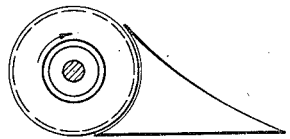
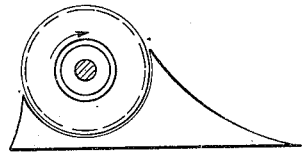
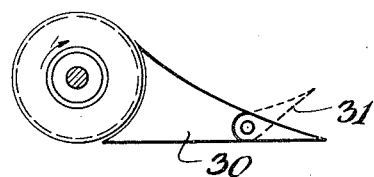
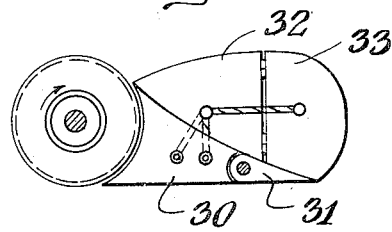
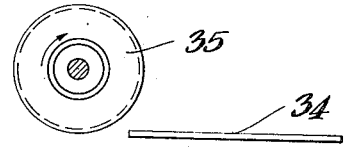
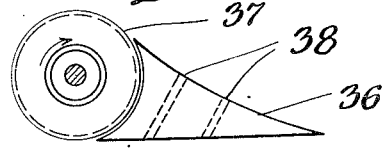
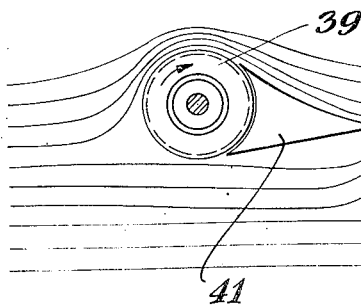
INVENTOR.
Edward F. Zaparka
BY Braselton, Whitcomb & Davis
ATTORNEYS.

May 5, 1936.  E. F. ZAPARKA  2,039,676
AIRCRAFT
Filed Sept. 12, 1930   7 Sheets-Sheet 4

INVENTOR.
Edward F. Zaparka
BY
Braselton, Whitcomb & Davis
ATTORNEYS.

May 5, 1936. E. F. ZAPARKA 2,039,676
AIRCRAFT
Filed Sept. 12, 1930 7 Sheets-Sheet 5
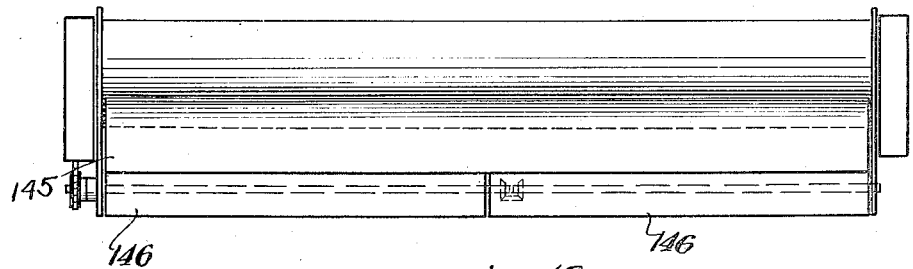
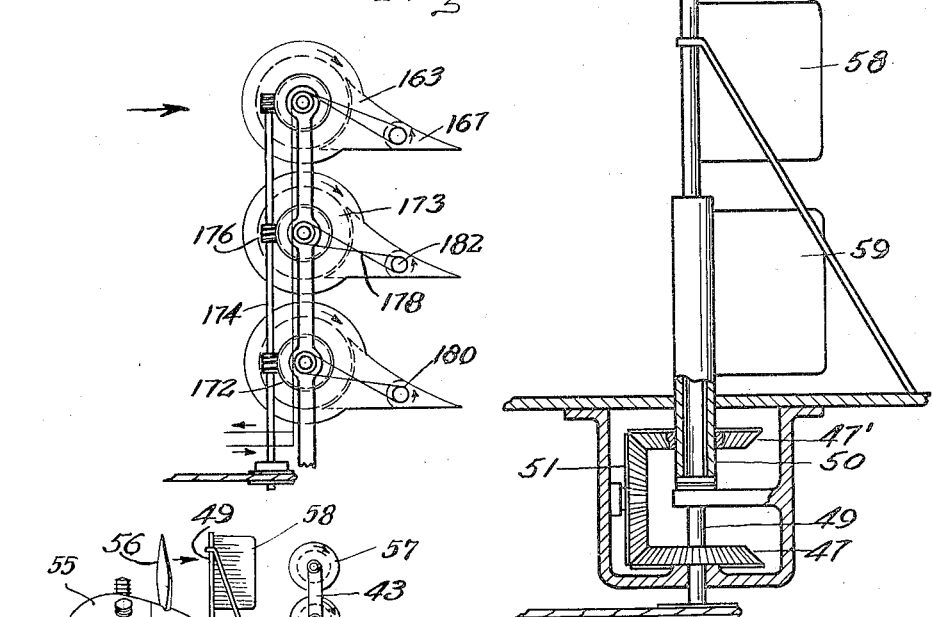
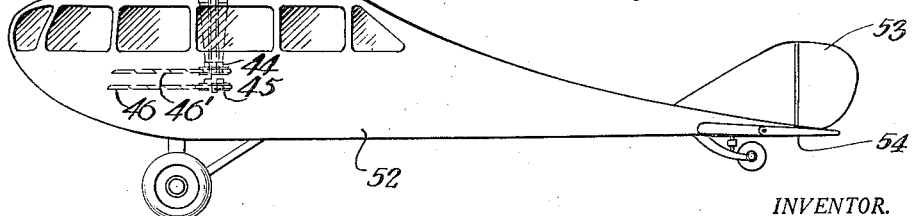
INVENTOR.
Edward F. Zaparka
BY Braselton, Whitcomb, Davis
ATTORNEYS.

May 5, 1936.   E. F. ZAPARKA   2,039,676
AIRCRAFT
Filed Sept. 12, 1930   7 Sheets-Sheet 6
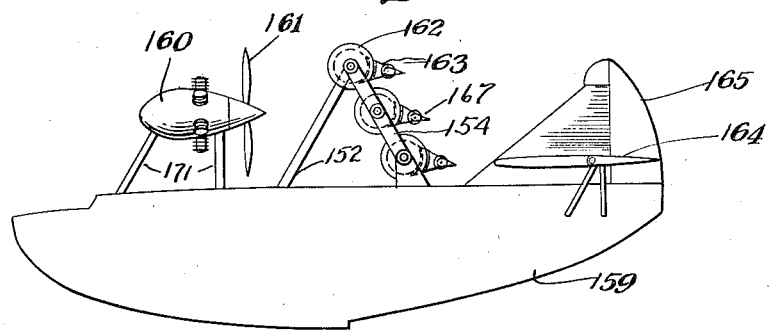
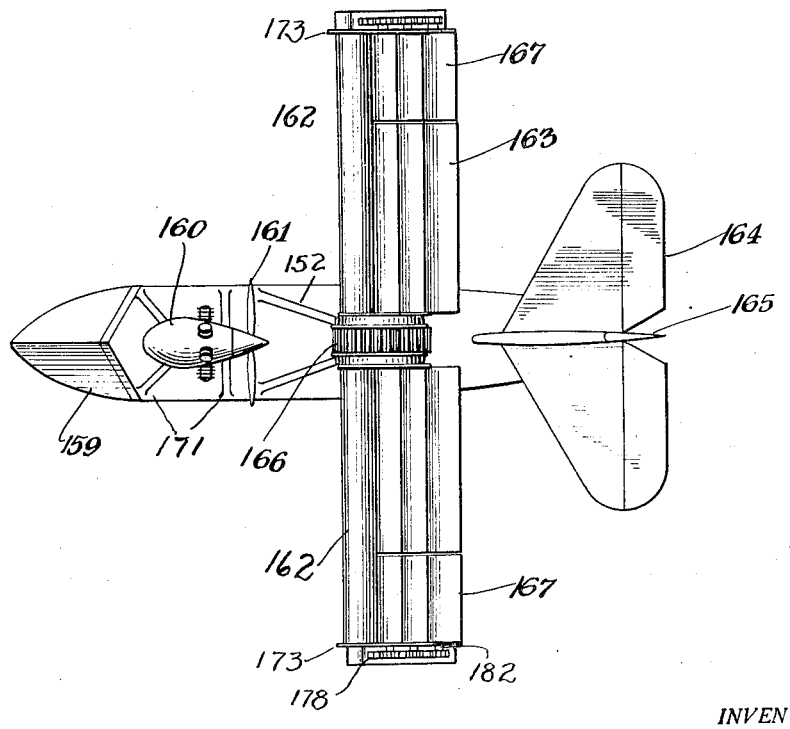

May 5, 1936.  E. F. ZAPARKA  2,039,676
AIRCRAFT
Filed Sept. 12, 1930  7 Sheets-Sheet 7
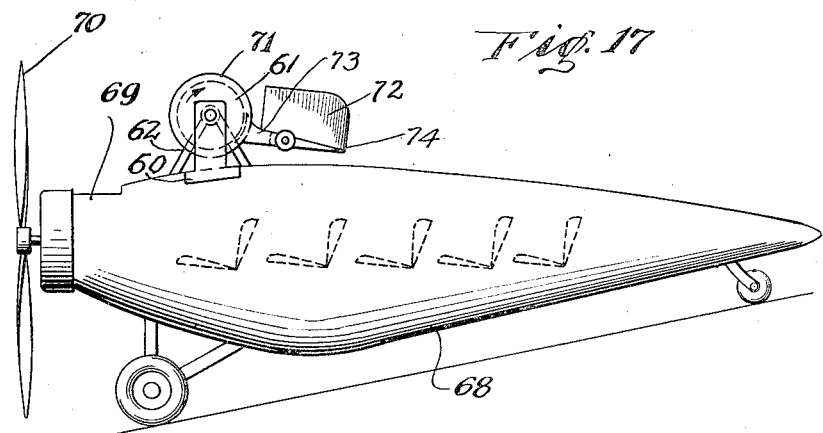
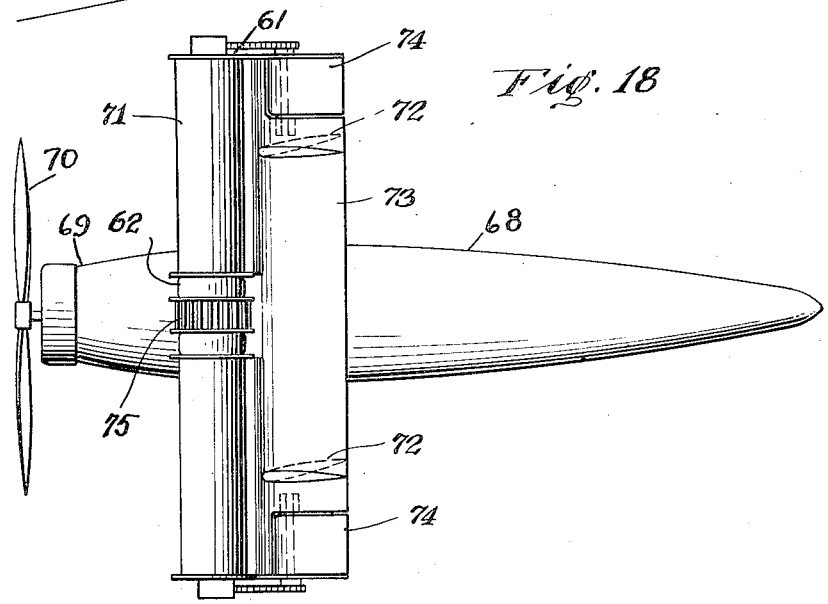
INVENTOR.
Edward F. Zaparka
BY Braselton, Whitcomb ~ Davis
ATTORNEYS.

Patented May 5, 1936

2,039,676

UNITED STATES PATENT OFFICE 2,039,676

AIRCRAFT

Edward F. Zaparka, New York, N. Y., assignor to Zap Development Corporation, Wilmington, Del., a corporation of Delaware Application September 12, 1930, Serial No. 481,528

2 Claims. (Cl. 244—14)

This invention relates to vehicles or apparatus adapted to be supported and moved in fluids by the reaction between the fluid and means carried by said apparatus and is applicable to land, water and amphibian types.

An object of the invention is the inclusion of means for controlling the flow of the fluid or its rate adjacent means adapted to produce what is called Magnus effects.

The invention includes the provision of control means for various devices such as aircraft wherein means are provided as a lifting or sustaining force, or wherein a member or the skin of a body or the border surface is moved and a force due to a Magnus effect is produced operating to modify the movement of the aircraft.

The invention comprehends the utilization in a vehicle having means for producing relative motion between the vehicle and the surrounding medium of means adapted to produce Magnus effect acting as a sustaining or lifting means, and means associated therewith for controlling the effective action of said sustaining means on the surrounding medium.

The invention further embraces a novel arrangement with respect to the propelling means of the vehicle and its resulting slip stream of movable means acting as a lifting force for the vehicle and means associated therewith for modifying or controlling its effective action whereby the controlling means are effective irrespective of the movement of the vehicle with respect to the surrounding medium.

Another object I contemplate is to provide controlling means peculiarly adapted to an aircraft utilizing Magnus effects as a sustaining force.

Another object I contemplate is to provide deflecting means for an aircraft using means adapted to produce Magnus effects so as to vary or modify the lift reaction of said means as desired.

Another object I contemplate is to provide controlling and deflecting means for an aircraft utilizing movable sustaining elements for controlling the stability, the rate of climb, forward speed and balance of the aircraft.

Another object I contemplate is to provide an arrangement of deflecting surfaces for an aircraft utilizing means adapted to produce Magnus effects to enable the standard type of aircraft control to be utilized effectively therewith.

Another object I contemplate is to provide controlling means peculiarly adapted to an aircraft utilizing means adapted to produce Magnus effects these controlling means acting in a similar manner as the standard ailerons.

Another object I contemplate is to provide controlling means of an aircraft utilizing movable sustaining elements located in the slip stream of the propelling means of said aircraft.

Another object I contemplate is to provide surfaces or guide means located in the path of the air stream resulting from the movable sustaining elements which in turn are placed in the slip stream of the aircraft propelling means for controlling the stability of the aircraft.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of certain forms of the invention, in which:

Fig. 1 is a diagrammatic side view of three sustaining elements of my invention occupying substantially the entire slip stream to the rear of an aircraft propeller;

Fig. 2 is a front elevational view of the sustaining and lifting devices, certain parts being shown in section;

Fig. 3 is a side view of an aircraft utilizing sustaining elements of my invention and shows diagrammatically the deviation of the slip stream of a propeller by the sustaining elements;

Figure 4:
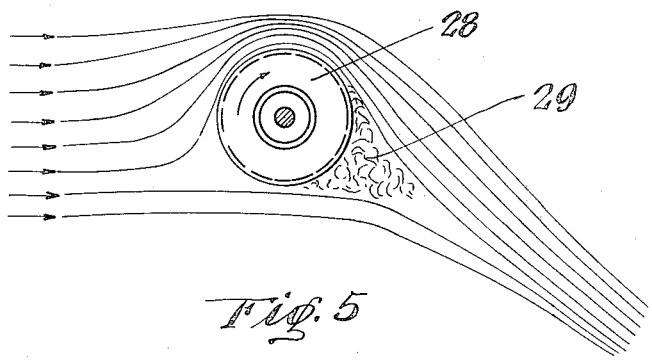
Figure 5:
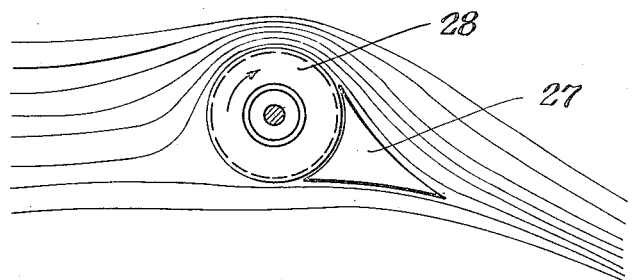
Figure 6:
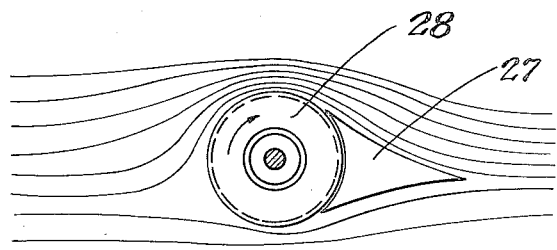
Figure 9:
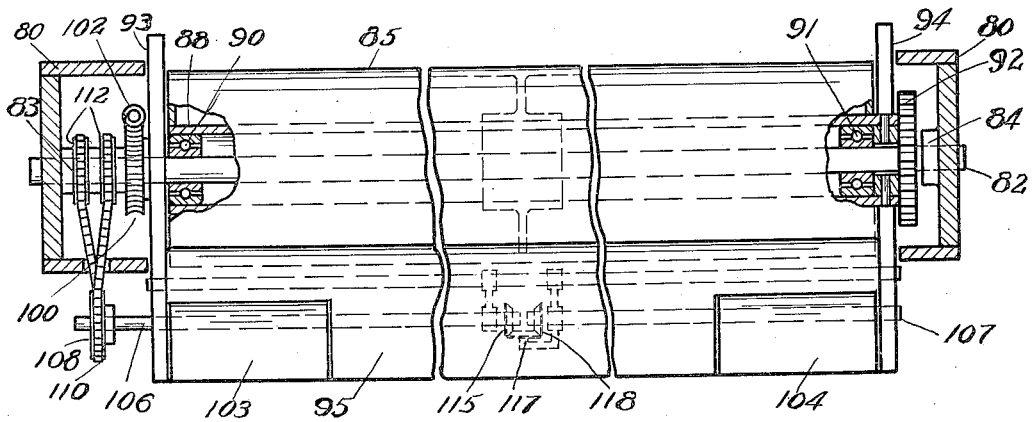
Figure 10:
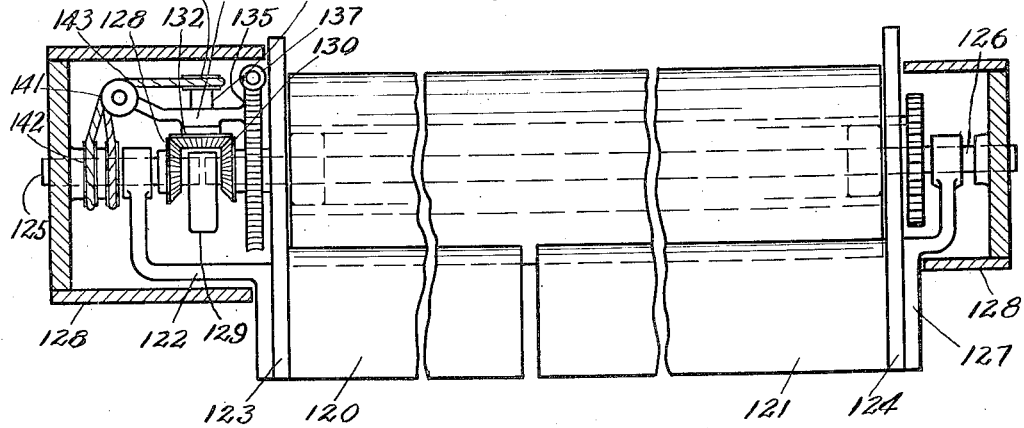

Fig. 4 diagrammatically shows a sustaining element and the flow of the medium adjacent thereto;

Fig. 5 is a view diagrammatically illustrating the flow of the surrounding medium adjacent to a sustaining element and guide or deflecting means associated therewith;

Fig. 6 is a view similar to Fig. 5 except that the deflecting surface has had its position changed to modify the air flow past the revoluble sustaining element;

Fig. 7a, 7b, 7c, 7d, 7e, 7f, and 7g are views of revoluble sustaining elements with different forms of deflecting surfaces;

Fig. 8 is a view of two revoluble sustaining elements progressively arranged with deflecting surfaces similar to those shown by Fig. 6;

Fig. 9 is a plan view of a revoluble sustaining element in combination with a deflecting surface similar to one of those shown by Fig. 7a, b, c and d, the two end portions of the deflecting surfaces being effective as ailerons certain parts being shown in section;

Fig. 10 is a view similar to Fig. 9 the deflecting surface is in this view divided to provide parts effective aileron control means.

Figure 11:
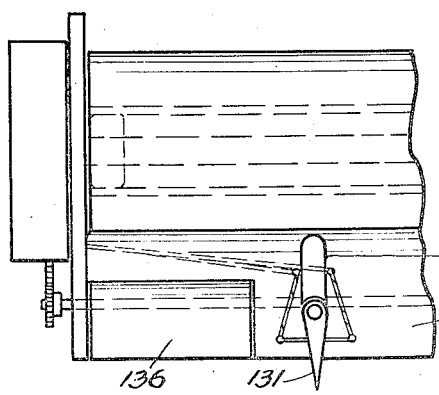

Fig. 11 is a fragmentary view of the apparatus shown in Fig. 9 associating therewith vertical stabilizer and rudder control surfaces;

Fig. 12 is a plan view of a revoluble sustaining element with a deflecting surface to the rear, the rear portions of the deflecting surface being pivoted to act as control surfaces;

Fig. 13 is a side view of three revoluble sustaining elements arranged one above the other, each of the elements having one associated deflecting surface;

Fig. 14 shows an aircraft where an aileron control of my invention is used in combination with movable sustaining means the fuselage being constructed so that the same directs the air adjacent to the sustaining means against the tail control surfaces.

Fig. 14A is a detail view showing a mechanism for operating the ailerons of my invention.

Fig. 15 is a side view of an aircraft employing revoluble sustaining elements and tail control surfaces, the control surfaces and the sustaining elements being brought close together, and the sustaining elements being provided with deflecting surfaces;

Fig. 16 is a plan view of the aircraft shown by Fig. 15;

Fig. 17 is a side view of an aircraft with a revoluble sustaining element, the control surfaces of the aircraft being immediately to the rear of the sustaining element, and Fig. 18 is a plan view of the aircraft shown by Fig. 17.

With an aircraft employing the ordinary type of fixed airfoils, it is necessary that the aircraft have a substantial speed before sufficient lift is exerted by the airfoils to support the aircraft. This is due both to the fact that the ordinary fixed airfoils are very inefficient and that but a small amount of the energy in the slip stream of the propeller of the aircraft is utilized by the fixed airfoils.

With an aircraft utilizing movable sustaining elements according to this invention, substantially the entire energy in the slip stream of the propelling means may be utilized by the sustaining elements and sufficient lift achieved thereby to lift the aircraft at relatively slow speed. The sustaining elements may be so arranged as to present lift surfaces to substantially the entire slip stream of a propeller. The revoluble sustaining elements may also be located in that part of the slip stream of a propeller where the velocity is highest, thus obtaining maximum lift. It is known that with a stationary aircraft the slip stream of a propeller first decreases and then increases in area so as to have just to the rear of the propeller a diameter less than that of the propeller diameter and then increases again in diameter past that point. I propose to locate the sustaining elements substantially in that portion of the propeller slip stream having a relatively small diameter since at such position the velocity is highest due to the fact that the entire slip stream is passing through a smaller space.

It is desirable for best results that the sustaining elements of my invention be revolved at a relatively high speed with respect to the speed of the air stream in which they are placed. The sustaining elements may be revolved at the desired speed by the power plant that operates the propeller, they may be rotated at such speed by an auxiliary power plant, or they may be rotated from the slip stream of the propeller by having air turbines and speed increasing means associated therewith. When rotating sustaining elements, presenting surfaces to substantially all the slip stream of a propeller, are revolved by an auxiliary power plant, and the pressures and velocities of the air between the propeller and the sustaining elements and the air passing said elements is measured, I have found that the amount of energy in the air passing the sustaining elements is substantially that in the propeller slip stream plus that required to propel the sustaining elements. I have found also, with an aircraft having little or relatively low speed with respect to the surrounding medium and with substantially the entire slip stream of the propeller occupied by the aircraft sustaining element, that substantially the entire propeller slip stream is deflected sharply downwardly by the revoluble sustaining elements so that at a distance substantially to the rear of said elements there is little or no moving air from the propeller slip stream. Therefore, with an aircraft utilizing revoluble sustaining elements, the ordinary tail control surfaces of the standard type, such as elevator and rudder are almost ineffective until the aircraft has obtained substantial speed with respect to the surrounding medium.

Since one of the great advantages of utilizing revoluble sustaining elements with aircraft is that the aircraft can rise and descend with little or comparatively low forward speeds control means especially adapted for use with such type of sustaining elements should be used. I have found that efficient controlling means for an aircraft utilizing revoluble sustaining elements can be provided for in several ways. One way is to place the controlling means in the slip stream of the propeller. Another way is to place controlling means adjacent to revoluble sustaining elements in the deflected airstream produced by said elements. Still a third way is to place deflecting means adjacent to the sustaining elements so that the air can be deflected rearwardly against control surfaces of the ordinary type.

Also I have provided deflecting means adjacent to and substantially at the rear of the sustaining elements in order to modify or decrease their resultant action and have in one embodiment of this invention combined such deflecting means with control means for the aircraft. With substantially the entire slip stream of a propeller occupied by the sustaining elements of my invention, an aircraft can rise or descend at substantially low forward speeds, all of the energy of the propeller slip stream being converted in the lift.

When the desired altitude of an aircraft has been obtained, the entire lifting action of the sustaining elements may be modified to increase the speed of the aircraft. Accordingly, I have provided deflecting means adjacent to the sustaining elements which may be so placed with respect thereto that their lifting action is not interfered with and which, when it is desired to modify or change the resultant lifting action of the sustaining elements said deflecting means may be placed in such a position as to deflect the airstream passing the sustaining elements, guiding or modifying the same to a direction substantially parallel to the line of flight.

Referring now to Figs. 1 and 2, the revoluble sustaining elements of my invention adapted to produce a lifting or sustaining force by the Magnus effect are shown in the form of a rotor or cylindrical moving surface, but a cone or other symmetrical surface having substantial length compared with its diameter can be used if desired. The sustaining elements may be made of light metal, wood, rubber, silk, cloth, or any fabric treated for protecting the same from the action of the elements. Figs. 1 and 2 diagrammatically illustrate the slip stream produced by a propeller and it can be seen that the sustaining elements or rotor members 25 are so arranged with respect to the propeller 26 and its resulting slip stream that the sustaining elements 25 are located at a certain distance from propeller 26 and in the region of the highest air velocity. Fig. 2 illustrates how several sustaining elements or rotor members may be placed occupying substantially the entire slip stream produced by the propeller.

In Fig. 2 of the drawings I have illustrated suitably supported upon the main body portion of the aircraft a frame 5 in which the sustaining elements 25 are rotatably mounted upon their longitudinal axis in a substantially horizontal position. The sustaining elements 25 as shown are fixedly secured to shafts 6 the extremities of which are supported by suitable bearings carried by frame 5. A member 7 is disposed adjacent to 5 in a spaced relation thereto, and provides additional supporting means for a gearing mechanism adapted to actuate the sustaining elements. Gears 9 are fixedly mounted on the shafts 6 of the rotor elements 25 and are in mesh with idler gears 10, the idler gears 10 are mounted on the shaft 11 the latter journalled on bearings 12 carried by frame 5 and support 7. The idler gears 10 are interposed between each of the gears 9 connected to the rotor elements for the purpose of causing rotation of each element in the same direction. Suitable driving means in the form of motor 14 either gas or electric is mounted on a suitable support carried by the main body of the aircraft, said motor being provided with a shaft 17 carrying sprocket 18 and the latter being connected by the means of a sprocket chain 19 with sprocket 20 fixedly carried by the lowermost gear of the gear train.

It can be seen that rotative motion can be imported to the elements 25 by the operation of motor 14 through the gearing mechanism hereinbefore described, and that the rotor elements 25 can be actuated at any desired speed by controlling the speed of said motor, or by substituting the sizes of sprocket 18 or 20. It will be apparent that by changing the size of any set of gears 9 and 10 the speed of rotation of one element can be changed with relation to the speed of the other elements.

Fig. 3 shows the action of the rotor members 25 in deflecting the slip stream of the propeller 26. It should be noted that the rotors occupy substantially the entire slip stream area, as shown in Figs. 1 and 2, and that the air after passing the rotors is deflected substantially vertically downward, this condition being present when the aircraft is at rest. When the aircraft is in motion the slip stream is not deflected downwardly to such an extent shown in Fig. 3.

Fig. 4 illustrates the conditions of air flow around a revoluble sustaining element or rotor member. The air is moving in the direction shown by the arrow and the sustaining element is revolving at high speed in the same direction. It is seen there that the flow lines are deflected from their path immediately in front of the rotor and most of the air particles rush to the side of the rotor surface which moves in the direction of stream flow increasing the speed of individual stream particles. On the side of the rotor where the surface moves in a direction opposed to that of the stream flow, the stream particles are retarded, the individual stream particles being repelled by the rotor surface and slowed up. Immediately to the rear of the rotor the stream particles are deflected sharply downward, there being a space at the lower back side of the rotor between the downwardly deflected stream particles and those particles slowed up by the rotor surface where it opposes the air flow in which eddy currents are set up as at the trailing edge of an ordinary airfoil.

In order to prevent the formation of eddy currents and increase the effective action of the movable sustaining elements, I have placed at this region deflecting means or a suitable deflecting surface of the desired form, the flow of air particles being continuous along its upper and lower surfaces. Such a deflecting condition is shown by Fig. 5, the deflecting means being illustrated in the form of a surface 27 being placed behind the rotor 28 and substantially occupying the region or space 29 which in Fig. 4 is shown to contain eddying currents of air. By using the deflecting surface 27 to prevent eddy currents of air, not only have I increased the normal efficiency of a rotor element, but I have provided a deflecting surface which can be used to modify the resultant action of the rotor element as desired, the condition which would occur where forward speeds rather than lift is desired from an aircraft after it has reached the desired altitude.

Fig. 6 shows the deflecting means in operation, the deflecting surface 27 having been swung upwardly to deflect the stream particles at the back side of the rotor or sustaining element 28 so that less air is deflected downward and more is projected to the rear of the rotor. Figs. 7a, b, c, d, e, f, and g show other forms of deflecting surfaces which may be used at the rear of rotor elements according to this invention. Figs. 7a and b show deflecting surfaces somewhat similar to those of Figs. 5 and 6 but having slightly different shapes which, although they might slightly decrease the efficiency of the rotor elements under conditions of maximum lift, they also might be more effective as deflecting surfaces when forward speed is desired. Fig. 7c shows another type of deflecting surface which may be used in conjunction with rotor elements. This deflecting surface has surfaces not only to the rear but just below the front of the rotor.

Fig. 7d shows that the rear portion of the deflecting surface of Fig. 7b may be pivoted to obviate the necessity for the deflecting surface to be swung bodily upward or to act as a control surface forming a part of the deflecting surface.

Fig. 7e illustrates one embodiment of the invention wherein I provide aircraft control surfaces adjacent to the rear of the sustaining elements. There the deflecting surface 30 has its trailing edge 31 hinged to act as an aileron or elevator control and has associated therewith a control surface or vertical stabilizer 32 together with the rudder control surface 33.

Fig. 7f shows a flat deflecting surface 34 to the rear of the rotor 35, this flat deflecting surface being effective as means for deflecting air to the rear of the sustaining element.

Fig. 7g shows a deflecting surface 36 substantially to the rear of the rotor 37, the deflecting surface having slots 38 cut through from its upper to its lower side in order to eliminate any tendency of eddy current formations adjacent thereto.

When several sustaining elements are used, I find it very desirable to place one adjacent the other so that one acts upon the stream delivered by the other. Fig. 8 shows such a condition, the front element 39 being placed slightly above the rear element 40. Element 39 has the deflecting surface 41, and the element 40 has the deflecting surface 42 associated therewith. The air acted upon by the rotor element 39 is delivered to the rotor element 40 with increased velocity, such velocity being modified by the position of the deflecting surface 41.

The arrangement of the deflecting surfaces 41 and 42 shown by Fig. 8 is that which would be made use of when high forward speed is desired from an aircraft. The air is speeded up by rotor 39, deflected against rotor 40 and again speeded up thereby, the deflecting surfaces 42 being in a position to deflect the air to the rear of the rotor elements substantially parallel to the line of flight. Either or both of the deflecting surfaces 41 or 42 may be swung downwardly to permit downward deflection of air by the rotors to provide increased lift when desired.

Fig. 13 illustrates how several rotor elements may be associated one above the other, each being provided with a deflecting surface to control the lift of the rotors, the deflection of the air past the rotor elements and the forward speed of the aircraft. This is the arrangement, except for the deflecting surfaces, already discussed in connection with Figs. 1, 2 and 3 where the rotor elements may be arranged to present surfaces to substantially the entire slip stream of a propeller.

Figs. 9, 10, 11 and 12 show plan views of rotor elements provided with deflecting surfaces of the type described in connection with Figs. 5, 6, and 7, in those figures only the side views having been shown.

In Fig. 9 I have illustrated a lifting and sustaining element and a mechanism for actuating the deflecting means and the side stabilizers or aircraft control associated therewith. On a frame 80 suitably secured to the main body portion of an aircraft is journalled a shaft 82 the latter supported at its extremities by suitable bearings 83 and 84 carried by frame 80. Shaft 82 serves as a bearing support for the rotor element 85, the latter being supported by means of a hollow shaft 88 supported upon bearings 90 and 91 on shaft 82. The sustaining element in this case comprises a hollow cylindrical metal body of light weight suitably secured to hollow shaft 88, and rotated by a gear 92 fixedly secured to said shaft. The rotor element 85 is actuated by a gear train arranged in a similar manner as the one illustrated in connection with Fig. 2. Adjacent the outer ends of the rotor element 85 are supports or plates 93 and 94, these plates are fixedly secured to shaft 82 and extend in planes transverse to the axis of rotation of the rotor element 85 projecting beyond the rotor periphery. Plates 93 and 94 act as end supports for the deflecting surface 95 or guiding element for controlling the direction of the air flow adjacent to the rotor element 85. The deflecting surface 95 as herein illustrated extends in the axial direction of the rotor over its length, or a portion thereof as desirable.

The mechanism for actuating the deflecting surface 95 around the rotor axis comprises a worm wheel 100 fixedly secured to shaft 82 and actuated by the worm element 102, the latter manipulated from any desired position by the operator or aircraft pilot. The position of the deflecting surface 95 with respect to rotor element 85 is changed by the movement of worm 102 which in turn rotates worm wheel 100 moving shaft 82 and plates or supporting members 93 and 94 carrying the deflecting surface around the axis of the rotor element 85.

Surface elements 103 and 104 of a shape substantially similar to the deflecting surface 95 are provided adjacent to the outer ends of the same. Surface elements 103 and 104 are pivotally carried by supports 93 and 94 respectively. Shaft 106 being journal supported in plate 93 and the deflecting surface 95. The surface element 103 is fixedly secured to shaft 106 the latter serving as a pivotal axis for said element. In axial alignment with shaft 106 is shaft 107 connected with shaft 106 by means of a differential gearing the purpose of which will be herein described. Shaft 107 carries surface element 104 and said shaft is supported in a manner similar to shaft 106.

In the projecting portion of shaft 106 adjacent to support 93 is fixedly secured a sprocket 108 adapted to be actuated by means of a chain 110, the latter supported upon idlers 112 loosely journalled upon shaft 82 and adapted to be actuated from any desired position. The surface elements 103 can be oscillated with respect to and independent of the deflecting surface 95 to any desired position irrespective of the location of surface 95 with respect to the rotor element 85, by means of chain 110 which rotates shaft 106 to which element surface 103 is secured. Any movement imparted to shaft 106 is transmitted to shaft 107 in the opposite direction by means of a gear 115 secured to shaft 106. Gear 115 is in mesh with a fixedly supported idler gear 117 which in turn is in mesh with a gear 118 fixedly secured to shaft 107. It can be seen that rotation of gear 115 will rotate idler gear 117 imparting to gear 118 a rotation in the opposite direction.

It will be apparent from the above that I have provided a mechanism adapted to actuate elements 103 and 104 independently of the deflecting surface 95 and adapted to move said elements in opposite directions so as to provide aileron control surfaces for the aircraft; thus one element being adapted to be moved in one direction at the same time that the other is being moved in the opposite direction.

In an aircraft utilizing the combination of movable elements and deflecting means therefor I have arranged the deflecting means so that the same will serve not only as means to prevent the formation of eddy currents but also act as aileron controls. Referring to the embodiment of my invention shown in Fig. 10, I have illustrated in connection with a rotor sustaining element's deflecting surfaces 120 and 121, being normally in horizontal alignment. The deflecting surfaces 120 and 121 are carried by plates or supports 123 and 124. Plate 123 is loosely mounted on shaft 126 while plate 124 is fixedly secured to shaft 126 by means of a member 127. Plates 123 and 124 extend adjacent to the rotor element in planes transverse to the axis of rotation and project beyond the periphery thereof. Connecting plate 123 with shaft 125 is a member 122 fixedly secured to the latter and adapted to move surface 120 by means of the actuation of shaft 125. Shaft 125 is suitably carried by frame 128 supported by the main body portion of the aircraft, and by member 129. Shaft 126 is journalled at one end on frame 128 and at its other end is supported by member 129 carried by the aircraft. Shafts 125 and 126 are interconnected by means of gears 128 and 130 respectively secured to said shafts and intermediate gear 132.

Adjacent to plate or support 123 is a worm wheel 135 loosely mounted upon shaft 126, and being connected to worm 137. Element or projection 138 is carried by worm wheel 135 this member acting as a bearing support for shaft 133 carrying gear 132. It can be seen that actuation of worm 137 will cause rotation of worm wheel 135 carrying the bevel gear 132 and in turn simultaneously rotating in the same direction gears 128 and 130 thereby oscillating the deflecting surfaces 120 and 121 in the same direction around the rotor element. In order that the deflecting surfaces 120 and 121 act as ailerons I have provided means to impart independent movement to each element in opposite directions. A pulley 140 fixedly secured to shaft 133 of bevel gear 132 serves to impart rotation to gear 132 in any desired direction by means of a band member 143 guided over idler 141 and 142 and manipulated by the operator from any desired location. Rotation of bevel gear 132 will impart motion in opposite direction to shafts 125 and 126 through the agency of gears 128 and 130, thereby the elements 120 and 121 carried by member fixed to said shaft will be carried in opposite directions around the sustaining element. It will be apparent from the foregoing that the deflecting surfaces can be moved simultaneously in any desired direction, and that they can be simultaneously actuated in opposite direction, acting as aileron control surfaces.

Fig. 11 shows that rudder surfaces 131 and vertical stabilizer surfaces 134 may be placed adjacent to the rear of the rotor elements to provide stabilizing and control surfaces for the aircraft, the end portions 136 of the deflecting surface 144 being effective as aileron.

In the modification of the invention shown in Fig. 12, I have illustrated in combination with the sustaining and lifting member or rotor element a deflecting surface 145 the trailing edge of which may be divided in equal parts 146 as herein shown. Surfaces 146 are operated by a mechanism of a similar nature as the one illustrated in Fig. 9 for actuating the surfaces 103 and 104. Surfaces 146 act in this modification as aileron control surfaces for an aircraft.

The means or deflecting surfaces or portions thereof which have been described as means effective to control the aircraft in the disclosures shown in Figs. 9 to 12 inclusive, on account of being placed adjacent to the rotor element are in rapidly moving air where considerable energy is present. Due to this fact, control surfaces there placed, even though their movement arms are comparatively short the same act very effectively as aircraft control means due to the force resulting from the energy of the medium adjacent thereto. In the form shown in Fig. 14, the means adapted to produce a lifting sustaining force by Magnus effect are shown in the form of a rotor member 57 horizontally disposed and suitably supported by a frame 43 carried by fuselage of an aircraft. Members 57 are suitably journalled at their respective outer ends upon frame 43. Each sustaining element is adapted to be rotated in the direction indicated by the arrows by suitable driving means or source of power through a gearing mechanism similar to the one shown in Fig. 2.

Propelling means for the aircraft are shown in the form of a power plant 55 located in front of the sustaining element and adapted to actuate propeller 56 connected thereto.

The sustaining elements 57 are placed in the slip stream resulting from the propeller 56. Surface members 58 and 59 are suitably carried by the fuselage on support 48, upon which are journalled member 49 and tubular member 50 directly secured to surface members 58 and 59 respectively. Surface members 58 and 59 are adapted to be moved on a common axis relative to each other, thus serving in a manner similar to aileron surfaces. These surfaces 58 and 59 are actuated by means of pulleys 44 and 45 secured to members 49 and 50 respectively receiving movement by the manipulation of bands 46 and 46'.

Surface members 58 and 59 serve to control very effectively the stability and balance of the aircraft, by changing their angularity with respect to the line of flight or movement of the aircraft, so that a pressure is exerted on said surfaces by the flow of surrounding medium tending to swing the aircraft about its longitudinal axis in the desired direction. Due to the fact that these surfaces are located in the slip stream of the propeller 56 where considerable energy is present the same can be made comparatively small, as the movement arms may be comparatively short without decreasing its effective action.

I have provided a fuselage construction where a portion of the fuselage adjacent to the rear of the sustaining elements 57 is curved to act as guiding or deflecting means for directing the air stream passing the sustaining means against the rudder 53 and elevator 54.

With this arrangement the surfaces act as ailerons as well as the elevator and rudder and are able to efficiently control the aircraft at comparatively low moving speeds independently of the air pressure developed by the relative motion of the aircraft with respect to its surrounding medium.

In Fig. 14A is shown a mechanism which can be used for actuating the surfaces 58 and 59 so that one moves in one direction while the other is being moved in the opposite direction. The mechanism comprises gears 47 and 47' suitably secured to shafts 49 and 50 interconnected by means of gear 51 loosely journaled on a frame supporting said mechanism to the fuselage, the surfaces being controlled by the movement of a band member actuating a pulley secured to shaft member 49. It is to be noted from the foregoing that the actuation of the band or other means operating shaft 49 will cause a change in the relative position of surfaces 58 and 59 so that the pressure of the air will tend to swing the aircraft over its longitudinal axis in a similar manner as the aileron.

I have illustrated in Figs. 15 and 16 one form of my invention as incorporated in an amphibian type plane, the plane comprising the fuselage 159 to which a suitable engine 160 adapted to drive propeller 161 is secured by means of a support 171. The sustaining means herein shown are in the form of a rotor. Surfaces 162 are horizontally disposed and suitably journaled upon frames 152 and 154 carried by the fuselage 159.

Associated with the sustaining means 162, I have provided deflecting means 163 carrying aileron 167. The sustaining surfaces 162 and the deflecting means 163 are arranged with respect to propeller 161 so as to be positioned in the comparatively high speed region of the slip stream of propeller 161. The tail control surfaces here shown are of the standard type comprising elevator 164 and rudder 165, which are placed adjacent to the surfaces 162 in order that tail controls may be actuated by the flow deflected or resulting from the sustaining means 162 and deflecting surfaces 163. Air driven turbines 166 which are attached to the sustaining elements 162 and preferably geared thereto, so as to give to the sustaining element a surface speed several times that of the air stream actuating the turbines 166.

The deflecting surfaces 163 and ailerons 167 are supported in a similar manner as the one previously described in connection with Fig. 9, and its actuating mechanism is shown in detail in Figs. 9 and 13, where a worm wheel 172 is fixedly secured to the end of discs or plates 173 carrying the deflecting surfaces 163, the latter actuated by a shaft 174 carrying worms 176 adapted to impart rotation to worm wheels 172. The ailerons 167 associated with each surface can be moved simultaneously in the desired direction by the actuation of a band 178 connecting pulleys 180 which are carried by shaft 182 to which the ailerons are suitably secured. Shaft 182 is journaled on plates 173.

Plates 173 are positioned transverse to the axis of rotation of the sustaining means extending beyond the periphery thereof, serving as means to increase their sustaining or lifting action by confining the air currents and preventing its spreading off.

In the aircraft construction shown in Figs. 15 and 16, the sustaining element 163 and the deflecting means 167 are so positioned with respect to the propeller 161 and the tail control surfaces 164 and 165 so that the actuation of the tail surface very effectively manoeuvres the aircraft. This has been accomplished by locating each sustaining element 162 and the deflecting surfaces 163 associated therewith in a position with respect to the adjacent elements whereby the air acted upon by one element is delivered with increased velocity and in turn is acted upon by the adjacent element. The slip stream passing said elements is then directed to the tail controls and due to the fact that these surfaces are located where considerable energy is present due to the high air velocity of the air passing the sustaining elements long moment arms are not required in order to change or control the direction of the aircraft.

In the embodiment shown in Figs. 17 and 18 the means adapted to produce a lifting or sustaining force by the Magnus effect are shown in the form of a rotor member suitably supported by the main body portion of the aircraft. The aircraft has a stream line fuselage to offer minimum resistance to the air and has at its front end portion a power plant 69 which actuates propeller 70. The rotor member 71 is suitably journalled at its outer end upon brackets or supports 60 fixedly secured to the fuselage 68. The rotor element 71 is adapted to be revolved by turbine 75 which is connected to the rotor 71 by means of suitable gearing mechanism, the latter housed on supports 62, so that the turbine drives the rotor at surface speed several times greater than that of the air which actuates or rotates the turbine.

Supported upon brackets or supports 60 are members or plates 61. Plates 61 extend in planes transverse to the axis of rotation of the rotor element and project beyond the periphery thereof, for the purpose that will be hereinafter described.

Mounted adjacent to the rotor element 71 are the rudder control surfaces 72, the deflecting means or surface 73 and the aileron surfaces 74, the deflecting surface 73 acting in this instance as an elevator control surface. Surface 73 is carried by plates 61, the latter serving to control the relative position of the deflecting surface with respect to the rotor element. The aileron 74 is also supported by plates 61 and is moved by a mechanism similar to the one shown in this connection in Fig. 9.

The control surfaces 72, 73 and 74 are in the slip stream adjacent to the rotor element, the latter being in turn in the slip stream of the propeller so that considerable air pressure is present to actuate the control surface. Due to this fact the short moment arms will act very effectively in controlling the aircraft.

In order to confine the air currents acting on the sustaining elements and prevent the same from spreading off the outer ends of the sustaining elements the plates or supports adapted to carry the deflecting means have been provided with a portion extending beyond the periphery of the sustaining element.

It is apparent that, within the scope of the invention modifications and different arrangements may be made other than is herein disclosed and the same could be used in different environments, the present disclosure being illustrative merely, the invention comprehending all variations thereof.

What I claim is:

1. In an aircraft the combination of a propeller carried by said aircraft, means to actuate said propeller; means located in the slip stream of said propeller acting as ailerons for controlling said aircraft means to change the position of said last mentioned means; a rotor element located rearwardly of said controlling means; and means to rotate said element.

2. In an aircraft, the combination of a Magnus force producing lifting means therefor; a plurality of control surfaces positioned in planes substantially at right angles to each other and adjacent said lifting means; means to change the relative position of said surfaces with respect to each other for controlling the direction of the aircraft.

EDWARD F. ZAPARKA.